No. 809,040. PATENTED JAN. 2, 1906.
M. G. BABIO.
VEHICLE WHEEL.
APPLICATION FILED MAR. 6, 1905.
2 SHEETS—SHEET 1.
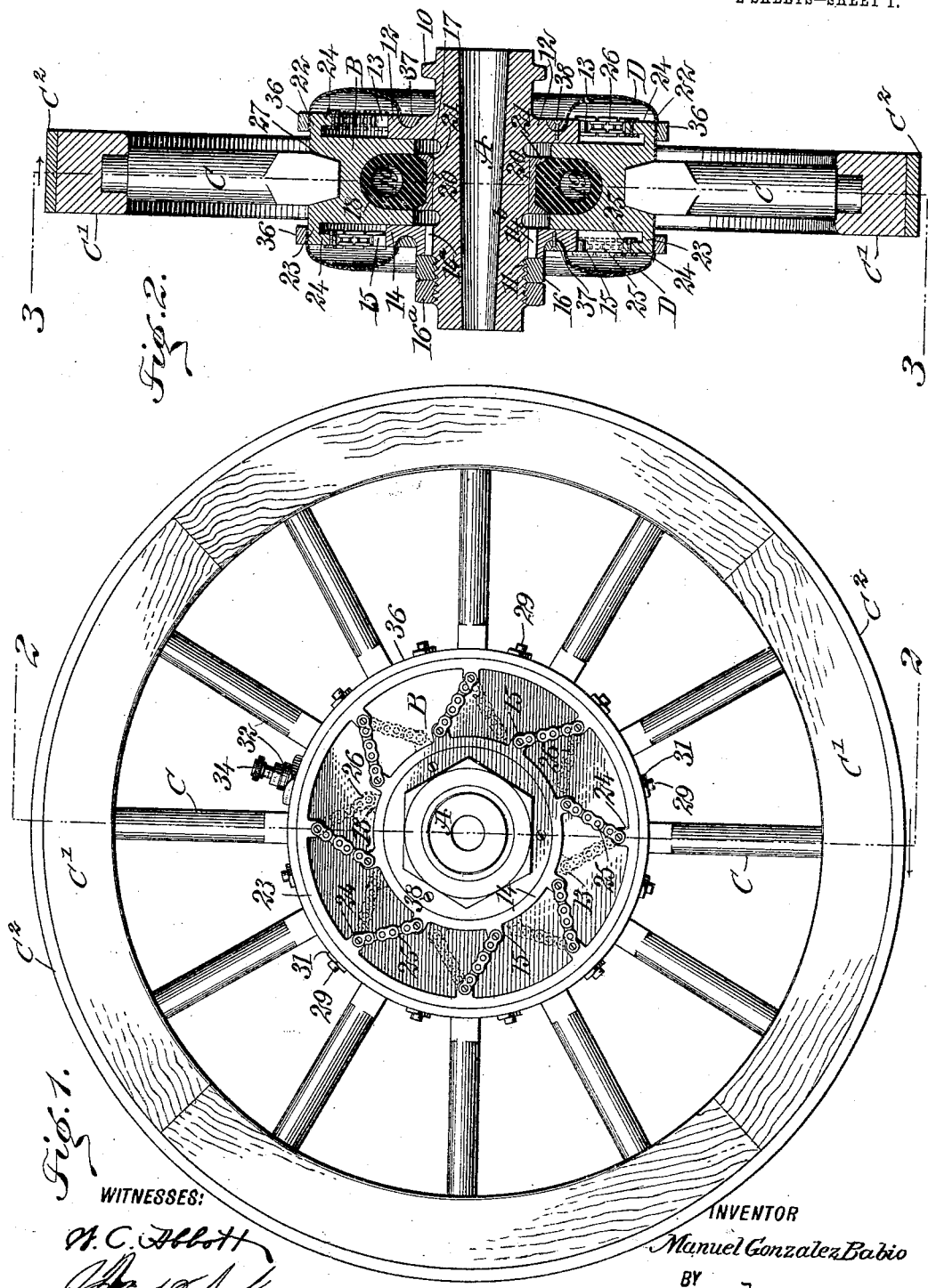
WITNESSES:
INVENTOR
Manuel Gonzalez Babio
BY
ATTORNEYS

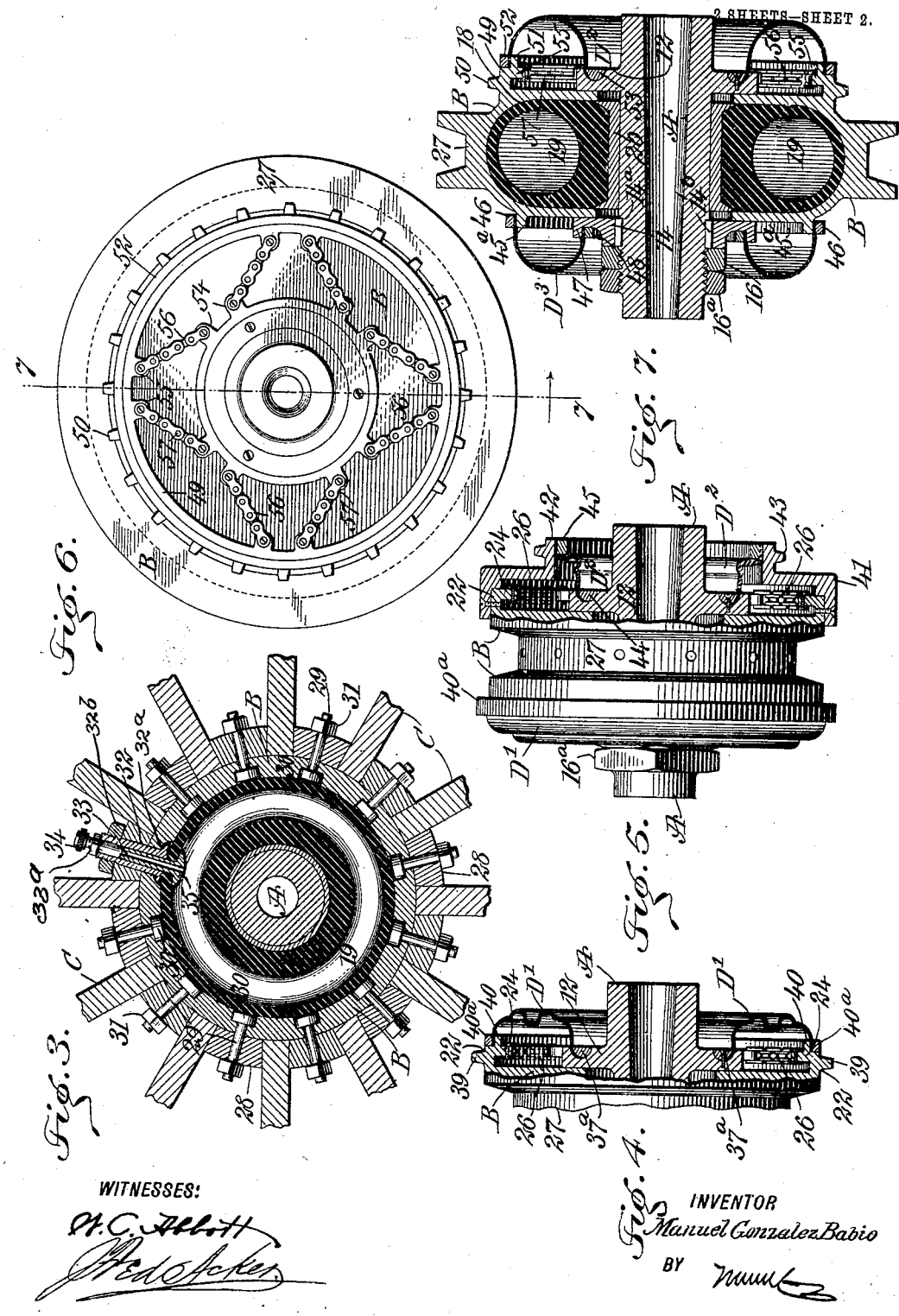

UNITED STATES PATENT OFFICE.

MANUEL GONZALEZ BABIO, OF NEW YORK, N. Y.

VEHICLE-WHEEL.

No. 809,040.  Specification of Letters Patent.  Patented Jan. 2, 1906

Application filed March 6, 1905. Serial No. 248,479.

*To all whom it may concern:*

Be it known that I, MANUEL GONZALEZ BABIO, a subject of the King of Spain, and a resident of the city of New York, borough of Brooklyn, in the county of Kings and State of New York, have invented a new and Improved Vehicle-Wheel, of which the following is a full, clear, and exact description.

My invention relates to an improvement in vehicle-wheels, particularly wheels for automobiles and like vehicles; and the purpose of the construction is to provide a wheel in which dishing strain is avoided and in which all necessary eccentric vibrations may take place at the center of the hub-section of the wheel when the wheel is in motion.

Another purpose of the invention is to provide a simple, safe, reliable, and at the same time economic construction of wheel as regards the maintenance and long life of the wheel and one in which the ordinary felly, spokes, and metal tire, or both metal and solid-rubber tire, can be employed and yet all the advantages of the cushioned or pneumatic tires be obtained without the discomforts of the latter and without their tendency to accidents, particularly their tendency to frequently slip from the wheel.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved wheel with the dust-guard removed. Fig. 2 is a vertical transverse section through the same on the line 2 2 of Fig. 1. Fig. 3 is a vertical section through the hub portion of the wheel, taken practically on the line 3 3 of Fig. 2. Fig. 4 is a sectional side elevation through a slightly - modified form of the wheel. Fig. 5 is a sectional side elevation of the hub-section of the wheel, showing another slight modification in sundry of its parts. Fig. 6 is a side elevation of the hub portion of a wheel, illustrating another manner of connecting the parts thereto; and Fig. 7 is a vertical section taken practically on the line 7 7 of Fig. 6.

With reference to the construction shown particularly in Figs. 1, 2, and 3, A represents what I term the "primary" hub of the wheel, and B the "secondary" hub, both made of any suitable metal. C represents the spokes, C' the felly, and $C^2$ the tire, which may be flat or segmental in cross-section and is made of a hard material, such as metal. The primary hub is provided with the customary tapering bore to receive the spindle of an axle and is shown provided at its inner end with an external integral driving-gear 10, and at the opposite end of the said primary hub A an exterior thread 11 is produced. I desire it to be understood, however, that the gearing on the wheel for the transmission of power can be made in any suitable manner, and the one referred to may be attached instead of forming an integral part of the primary hub. Other preferred forms of gearing are shown in the other views and will be hereinafter described. A disk-flange 12 of any preferred diameter is made integral with the exterior of the primary hub A at a point between its center and its inner end, and a series of apertured lugs or eyes 13 extend from the periphery of said flange, being placed at suitable distances apart, as is shown in Fig. 1. A second and corresponding disk-flange 14 is removably placed on the primary hub A between its center and outer or threaded end, as is shown in Fig. 2, which removable disk flange 14 is keyed at opposite points to the hub A, the keys being designated as $14^a$ and $14^b$, being also shown in Fig. 2. The outer or removable disk-flange 14 is provided with peripheral apertured lugs or eyes 15, corresponding in number and spacing to those on the integral disk-flange 12. The lugs or eyes on one disk-flange are out of horizontal alinement with those of the opposing flange, as is indicated in Fig. 1, only for the sake of demonstration; but they may be in horizontal alinement with those of the opposing flange, and in practice they will be made one way or the other. The drawings, however, show them staggered. A nut 16 and lock-nut $16^a$, screwed on the threaded portion of the primary hub A, serve as additional means for holding the disk-flange 14 in place. The secondary or auxiliary hub B is held centrally around the primary hub and is in the form of a ring of suitable thickness, the said secondary hub being held in such position that an annular space 17 intervenes between the two hubs, enabling the secondary hub B to have more or less movement to and from the primary hub A. An annular chamber 18 is formed in the inner edge portion of the secondary or auxiliary hub B, said chamber being preferably of inverted-U shape in cross-section, and in the said chamber 18 an endless pneumatic tube 19 is snugly fitted, which tube 19 is circular and acts as a cushion for the entire wheel, taking the place of the customary cushion or pneumatic tire, and serves, by means of its position, to preserve the axle from certain sudden shocks or strains and does not give such a springing action to the body of the vehicle as do the outside pneumatic tires. Furthermore, as the circular pneumatic tube or cushion 19 is thoroughly protected its lifetime is much longer than that of the pneumatic tire, and said cushion or tube 19 cannot be sprung from its position nor break under the most severe usage. In order that the under face of the circular pneumatic tube or cushion 19 shall not grind upon the main or primary hub A, the said tube rests upon an endless band 20, preferably of light hard steel. This protective band 20 is mounted to turn loosely upon the main or primary hub A and has outwardly-extending marginal flanges 21, the inner faces of which flanges are preferably tapered, and as these flanges 21 bear against the sides of the pneumatic tube 19 the band 20 is prevented from having undue lateral movement. Annular outer marginal ribs 22 and 23 extend from the side faces of the secondary or auxiliary hub B, as is shown in Fig. 2, and apertured lugs or eyes 24 extend inwardly from the ribs 22 and 23, placed at equal distances apart and in horizontal alinement, as is shown in Fig. 1 and 2; but the lugs 24 on the ribs 22 and 23 are staggered (only for the sake of demonstration in the drawings, as hereinbefore stated) with relation to the lugs on the flanges 12 and 14 of the main or primary hub A. The two hubs are connected by two series of chains—namely, an outer series 25 and an inner series 26—as is shown in Figs. 1 and 2. The chains of the outer series 25 extend diagonally in one direction from the lugs 15 on the outer disk-flange 14 to the lugs 24 on the outer rib 23 of the secondary or auxiliary hub, while, as is shown by dotted lines, the inner series of chains 26 extend from the lugs 13 of the inner or fixed disk-flange 12 also diagonally, but in an opposite direction to the chains 25, to the lugs 24 on the inner rib 22 of the secondary hub B.

When power is applied to the primary or main hub to turn it in a forward direction, as soon as the chains of the outer series 25, for example, are tightened, the secondary hub and the attached parts of the wheel will be compelled to turn in the same direction, and when the primary hub is turned in a reverse direction to back the vehicle the other set of chains 26 will be brought into action to force the hub B also to turn rearwardly. Only one set of chains acts at one time, and, owing to the cushion connection between the hubs, one set is started after the other, and an initial start forward or backward is made without perceptible shock or jar to the occupants of the vehicle. In fact, the starting movement or the reversing movement of the wheels in either one or the other direction is much more smoothly accomplished than is possible with the ordinary wheel. If the vehicle is to be drawn by a team, for example, and the improved wheels are employed, the action will be transmitted from the primary hub to the secondary hub by means of the chains without any perceptible shock or jar to the occupants of the vehicle, as above mentioned.

A substantially V-shaped channel 27 is made in the peripheral surface of the secondary or auxiliary hub B, and the inner ends of the spokes C are properly fitted to the said channel 27, as is shown in Fig. 2. These spokes C are held spaced apart by means of wedge or tapering blocks 28, placed between them, as is shown in Fig. 3, the said blocks being likewise made to enter the channel 27, being fitted thereto at their inner ends, and the various spacing-blocks 28 are held in position by bolts 29, the heads 30 of which bolts are preferably countersunk in the upper wall of the channel 18 in the inner edge of the said secondary hub, as is also shown in Fig. 3. These bolts are made to extend out through and beyond the said secondary hub at its channel 27 and through the spacing-blocks 28, the outer ends of the bolts being provided with nuts 31 or their equivalents. One bolt 32 differs from all the other bolts 29, as is shown in Fig. 3, in that the bolt 32 is hollow or is provided with a bore extending through from end to end. The hollow stem 33 of a valve 34 of any suitable construction is passed through the bore in the hollow bolt 32, which bolt is provided with a flange $32^a$ in close engagement with the outer face of the pneumatic tube 19, as is illustrated in Fig. 3, and, as is also shown in the said Fig. 3, the valve-stem 33 is provided wth a flange 35, which has bearing against the inner face of the pneumatic tube 19. The valve-stem 33 is provided with a nut $33^a$, which bears upon the top of the bolt 32, and the said bolt is provided with a nut $32^b$, having bearing upon a spacing-block 28. The pneumatic tube 19 is cast on the valve-stem 33, and in assembling the parts the bolt 32 is placed in position on the secondary hub the same as the other bolts 29, and after the pneumatic tube has been placed in its position the valve-stem 33 of the valve 34 is passed into and through the bore in the bolt 32 and the nuts $33^a$ and $32^b$ are tightened up, causing the pneumatic tube to be held firmly between the two flanges $32^a$ and 35.

In connection with both sides of the hub-sections of the wheel I employ dust-guards D. These dust-guards may be made of any suitable material; but preferably a pliable waterproof material is employed, such as rubber or rubber and canvas. The dust-guards D are provided with a suitable opening, and their outer edges are secured over the ribs 22 and 23 of the auxiliary or secondary hub B by means of slip-collars 36 or their equivalents, and the outer faces of the disk flanges 12 and 14 are preferably provided with annular grooves, as is shown in Fig. 2, in which grooves the inner edges of the dust-guards are fitted and held in position by rings 37, fitted to the said grooves and held in place by screws 38 or the like, as is shown in Fig. 1.

The only difference between the construction shown in Fig. 4 and that which has been described resides in that the driving-gear is carried by the secondary or auxiliary hub B and the character of the dust-guard D' is somewhat changed. In Fig. 2 it will be observed that the dust-guard is a plain ring having its surface bulged more or less outward between its points of engagement with the hub-section. The same is true of the dust-guard D'; but the said dust-guard is made full, and the fullness is taken up more or less by corrugations. Under the said construction shown in Fig. 4 gear-teeth 39 are formed upon the peripheral surface of the inner rib 22 of the secondary hub B, and a downwardly and outwardly extending circular step-section 40 is formed integral with the said rib 22, and the said rib 22 is also provided with the lugs 24, to which one end of the inner series of chains 26 is secured. The outer edge of the dust-guard D' is secured to the outer face of the step-section 40 by means of a slip-ring 40$^a$, and the inner edge of the said dust-guard D' is secured at the cavity formed in the outer face of the fixed disk flange 12 of the hub-section A by means of a ring 37$^a$, secured to the said disk flange by means of screws or like devices. It will be understood, however, that the form of dust-guards D or D' may be used either in the inner or outer face of the hub-sections. (Shown by Figs. 1, 2, and 7.)

With reference to the construction shown in Fig. 5 the driving is also effected in said construction from the secondary hub B, but in a slightly different manner from that shown in Fig. 4. The construction of the secondary hub B is identical with that shown in Fig. 2; but a flanged ring 41 is bolted or otherwise secured to the outer face of the said rib 22 from the said secondary hub B, and the said ring at its inner edge has integral therewith an outwardly-extending collar 42, upon which teeth 43 are formed. The dust-guard D$^2$ employed at this side of the wheel is made in the form of a small ring, its inner edge being secured to the flange 12 of the main hub A by a ring 44, secured thereto, and the opposite or outer end of the dust-guard D$^2$ is held firmly to the inner face of the collar 42 by means of a slip-ring 45. This dust-guard D$^2$ is made quite full, so as to have corrugations therein also, enabling it to be readily fixed in place. The object of the corrugations is to allow free play to the main hub without any damage to the dust-guards.

Under the construction shown in Figs. 6 and 7 the same character of main hub A and auxiliary or secondary hub B is employed, and they have the same relation to each other; but the chamber 18 is made much broader and much deeper, and the auxiliary hub B is made to extend further from the main hub A, thus making a modification in the shape of construction of the secondary hub, which is provided with concave shoulders on both sides. Another departure consists in that the connecting-chains are all at the inner side of the hub structure. Therefore at the outer side of the auxiliary or secondary hub-section B a simple annular rib 45$^a$ is formed, and a corresponding annular rib 47 is produced at the peripheral portion of the front disk-flange 14, as is shown clearly in Fig. 7. The dust-guard D$^3$, which is of the type shown in Fig. 2, has its upper end secured to the plain rib 45$^a$ by a slip-collar 46, while a second slip-collar 48 securely holds the inner edge of this outer dust-guard to the rib 47 on the said flange 14. At the opposite side of the said auxiliary or secondary hub B a horizontal rib 49 is formed, and gear-teeth 50 are produced on the exterior of the said rib, while an annular flange 51 is likewise formed at the lower outer edge of the said rib 49, and from the lower portion of the rib back of the annular flange 51 apertured lugs or eyes 55 extend downward in pairs, the pairs of lugs or eyes 55 being an equal distance apart. Corresponding lugs 54 are formed on the periphery of the disk 12 integral with the main hub A; but the apertured lugs or eyes 54 on the disk 12 are staggered (for the sake of demonstration, as hereinbefore stated,) with relation to the eyes or apertured lugs 55, carried by the auxiliary or secondary hub B, as shown particularly in Fig. 6. Two series of chains 56 and 57 are likewise employed to connect the two hubs A and B; but, as stated, both series of chains are on the inside face of the hubs and not upon both the inner and the outer faces, as under the other constructions. One series of chains 56 extend diagonally in one direction from a lug 54 to the opposite lug 55, while the chains 57 of the other series extend diagonally in an opposite direction from a lug 54 of the same pair to a corresponding lug 55 of a pair carried by the auxiliary or secondary hub B, as is clearly shown in Fig. 6. Under this construction the operation is the same as has been given, one set of chains acting when the wheel is to be turned back and the other set of chains acting when the wheel is to be advanced; but on no occasion do the two sets of chains act simultaneously. The dust-guard D$^2$ at the inner side of the hubs is secured at its outer edge to the annular flange 51 by means of a slip-ring 52, while another ring 53 presses the inner edge of the said dust-guard in a groove produced in the outer face of the flange 12, forming an integral portion of the hub A.

It should be understood that the series of chains shown in Figs. 1 and 2 may be used in the construction shown in Figs. 6 and 7, making the necessary changes of the parts shown throughout the several views of the drawings, and, vice versa, the series of chains shown in Fig. 6 may be used in the construction represented by the other figures.

Having thus described my invention, I claim as new, and desire to secure by Letters Patent—

1. In vehicle-wheels, an inner and an outer hub, one mounted loosely around the other, said outer hub being provided with gearing on the peripheral surface of the inner rib of the hub, a circular pneumatic tube fitted in the outer hub and having constant bearing upon the main hub by means of an endless band intervening between the two, a hollow bolt in connection with said pneumatic tube, and chains connecting the two hubs, which chains are in independent series, acting in opposite directions.

2. In vehicle-wheels, two spaced hubs, one surrounding the other and having movement to and from the other, an intermediate circular pneumatic tube jacketed in one hub and having bearing upon the other hub, means for supplying the said pneumatic tube with air, devices for preventing lateral movement of the surrounding hub, which devices are carried by the hub surrounded, series of chains attached to both hubs, the chains of both series being diagonally arranged but inclined in opposite directions, corresponding chains for the two series forming a triangle widest at the inner hub, dust-guards for the two hubs, means for securing the dust-guards in position, and a driving-gear carried by one of the hubs, as set forth.

3. In vehicle-wheels, an inner and an outer hub, one mounted loosely around the other, the outer hub being provided with a channel in its peripheral surface and with a chamber in its inner surface, said outer hub having eccentric movement to and from the inner hub, means carried by the inner hub for preventing lateral movement of the outer hub, a circular pneumatic tube located within the chamber of the outer hub and having bearing relative to the inner hub, dust-guards, with or without corrugations, for both sides of both hubs, means for securing the said guards in position, spokes fitted at intervals at their inner ends in the peripheral channel of the outer hub, a felly connected with the spokes, a metal tire for the felly, series of chains attached to both hubs, the chains of both series being diagonally arranged but inclined in opposite directions, each series of chains being independent in action, one series being employed in an advance movement of the wheel and the other in a reverse movement, spacing-blocks wedged between the spokes into the peripheral channel of the outer hub, and locking devices for the spacing-blocks, all arranged for the purpose specified.

4. In vehicle-wheels, a primary and a secondary hub, a cushion between the two hubs, flexible elements connecting the hubs, the elements being in series and the elements of one series being inclined in an opposite direction to the elements of the other series, a flanged ring secured to the secondary hub, provided with an attached gearing and a dust-guard, and means for attaching the said dust-guard to the flanged ring and to the primary hub.

5. In vehicle-wheels, a primary and a secondary hub, one mounted to revolve over the other, flexible elements connecting the said hubs, which elements are in two series, the elements of one series having an inclination the reverse of the inclination of the other series, a flanged ring secured to the inner peripheral portion of the secondary hub, a collar extending from said ring, teeth exteriorly produced on the collar, a dust-guard, a ring adapted to hold the dust-guard in connection with the said collar, and another ring arranged to hold the dust-guard in relation to the primary hub.

6. In vehicle-wheels, an inner or main hub having an integral disk-flange with a series of peripheral lugs projecting outward and also a removable disk-flange mounted on the hub, said disk having a series of peripheral lugs projecting outward in the same manner as those of the integral disk-flange of said hub, an outer or secondary hub provided with an inner annular chamber U-shaped in cross-section, and an exterior circular channel serving as a seat for the wheel-spokes, said secondary hub provided with a series of integral lugs projecting on each side, an intervening pneumatic cushion of U shape in cross-section, and flexible driving connections between the two hubs.

7. In vehicle-wheels, an inner or main hub and an outer or secondary hub, the latter with parallel sides in a straight line from the inner edge to the outer edge, and also with concave or round shoulders projecting outward from its side, said secondary hubs (denominated parallel sides and concave shoulders respectively) being provided with marginal ribs extending outwardly and said ribs provided with lugs extending inwardly, an intervening pneumatic cushion of U shape in cross-section, and flexible driving connections between the main and secondary hubs.

8. In vehicle-wheels, an inner or main hub and an outer or secondary hub, an intervening pneumatic cushion provided with an integral circular base at its inner portion, said base having a flat face, an endless band of marginal flanges adapted to be engaged by the said flat face of the said circular base, two series of chains located in opposite diagonal relation to each other and having direct communication with both hubs, each series acting in opposite directions so as to impart forward and backward movement respectively to the wheel.

9. In vehicle-wheels, an inner or main hub and an outer or secondary hub, a pneumatic cushion having at its inner portion an integral circular base, said cushion having direct bearing with relation to the secondary and the main hubs, the bearing with the latter being effected by an endless band intervening between the cushion and the main hub, chains arranged in two series, the chains of one series having an opposite diagonal direction to those of the other series, which chains extend directly to and from the main and secondary hubs respectively, each series acting in an opposite direction, one series being adapted for action to accomplish an advance movement of the wheel and the other series to accomplish a rearward movement.

10. In vehicle-wheels, an inner or main hub provided with a driving-gearing, an integral disk-flange with a series of lugs extending from said flange, a removable disk-flange having a series of lugs extending from said flange, a collar or endless metal band with marginal flanges carried by the main hub in connection with an elastic cushion of U shape in cross-section said collar being made to turn loosely on said hub, an outer or secondary hub loosely surrounding the main hub and having vertical movement to and from the same, a pneumatic cushion connected to the secondary hub, having direct action relative to the main hub, and flexible driving connections between the two hubs, which connections are in two series diagonally arranged but inclining in opposite directions, one series being adapted for action to accomplish an advance movement of the wheel and the other series to accomplish a rearward movement.

11. In vehicle-wheels, an inner and an outer hub, as described, one mounted loosely around the other, said outer hub being provided with gearing on the peripheral surface of the inner rib of the hub, a circular pneumatic tube of U shape in cross-section fitted in the interior chamber of the outer hub and having constant bearing upon the main hub by means of an endless band intervening between the pneumatic tube and the inner hub, a hollow bolt in connection with said pneumatic tube and the outer hub, and chains in direct connection with the two hubs, which chains are in independent series, acting in opposite directions.

12. In vehicle-wheels, two spaced hubs, as described, one surrounding the other and having movement to and from the other, an intervening circular pneumatic tube jacketed in the outer hub and having bearing upon the hub by means of an endless band in connection with the said pneumatic tube, and series of chains in direct connection with both hubs, the chains of both series being diagonally arranged but inclining in opposite directions, corresponding chains of the two series forming a triangle for the purpose described of allowing free eccentric play of the main hub to and from the other.

13. In vehicle-wheels, two spaced hubs, as described, one surrounding the other, the outer hub having a series of lugs on each side extending from said sides, an intervening circular pneumatic tube jacketed in the outer hub and having bearing upon the other hub, series of chains in direct connection with both hubs, the chains of both series being diagonally arranged but inclining in opposite directions, corresponding chains of the two series forming a triangle, a channel formed in the outer hub for the purpose described, spokes fitted in said channel, a felly receiving the spokes, and a hard tire for the felly.

14. In vehicle-wheels, two spaced hubs as described, one surrounding the other and having movement to and from the other, an intermediate circular pneumatic tube jacketed in the outer hub and having bearing upon the main hub, means for supplying the said pneumatic tube with air, devices for preventing lateral movement of the surrounding hub, which devices are carried by the hub surrounded as described, series of chains in direct connection with both hubs, the chains of both series being diagonally arranged but inclined in opposite directions, corresponding chains for the two series forming corresponding triangles, dust-guards for the two hubs as described, means for securing the dust-guards in position, and a driving-gear carried by one of the hubs as set forth.

15. In vehicle-wheels, an inner and an outer hub as described, one mounted loosely around the other, the outer hub being provided with a channel in its peripheral surface and with a chamber in its inner surface, said outer hub having eccentric movement to and from the inner hub, means carried by the inner hub for preventing lateral movement of the outer hub, a circular pneumatic tube of U shape in cross-section located within the chamber of the outer hub and having direct bearing relative to the inner hub, dust-guards, with or without corrugations for both sides of the body of the hubs, means for securing the said guards in position, spokes fitted at intervals in the peripheral channel of the outer hub, a felly connected with the spokes, a metal tire for the felly, series of chains in direct connection with both hubs, the chains of both series being diagonally arranged but inclined in opposite directions, each series of chains being independent in action, one series being employed in an advance movement of the wheel and the other in a reverse movement, spacing-blocks wedged between the spokes into the peripheral channel of the outer hub, and locking devices for the spacing-blocks, all arranged for the purpose specified.

16. In vehicle-wheels, a primary and a secondary hub as described, a pneumatic cushion between the two hubs, flexible elements in direct connection with the hubs, as described, the elements being in two series and the elements of one series being inclined in an opposite direction to the elements of the other series, a flanged ring or disk secured to the secondary hub, provided with an attached gearing and a dust-guard, and means for attaching the dust-guard to the flanged ring and to the primary hub.

17. In vehicle-wheels, a primary and an auxiliary hub, said hubs being provided at one or both sides with direct driving-chain connections arranged in two series, both series being in diagonal relation to both hubs, but one series of chains being in an opposite direction to the other with relation to said hubs, a driving flanged ring secured to the auxiliary hub, a dust-guard in connection with the said ring and the primary hub, and rings adapted to hold the dust-guard in position.

In testimony whereof I have signed my name to this specification in the presence of two subscribing witnesses.

MANUEL GONZALEZ BABIO.

Witnesses:
J. FRED ACKER,
JNO. M. RITTER.